United States Patent [19]

Dumont

[11] 4,292,630

[45] Sep. 29, 1981

[54] DEVICE FOR THE OBTAINING OF AN ELECTRIC SIGNAL WHICH IS PROPORTIONAL TO AN AMOUNT OF MOVEMENT AND THEREFORE CAPABLE OF DETECTING ANY MOVEMENT OR ACCELERATION

[75] Inventor: Claude Dumont, Heillecourt, France

[73] Assignee: Societe d'Etudes Techniques et Commerciales d'Automation, France

[21] Appl. No.: 22,994

[22] Filed: Mar. 22, 1979

[30] Foreign Application Priority Data

Sep. 19, 1978 [FR] France ............................... 78 26759

[51] Int. Cl.³ ........................................... G08B 21/00
[52] U.S. Cl. .............................. 340/573; 200/DIG. 2; 200/DIG. 36; 250/221; 307/117; 340/669
[58] Field of Search ............... 340/573, 669, 600, 566, 340/540; 250/221; 200/DIG. 8, DIG. 9, DIG. 36, DIG. 2, 61.52, 61.45 R; 307/117

[56] References Cited

U.S. PATENT DOCUMENTS

| | | | |
|---|---|---|---|
| 3,163,856 | 12/1964 | Kirby | 340/573 |
| 3,336,530 | 8/1967 | Sloan et al. | 340/573 |
| 3,588,858 | 6/1971 | Demuth | 340/573 |
| 3,709,030 | 1/1973 | Aselman, Jr. | 200/61.52 |
| 3,786,406 | 1/1974 | Bianco | 340/573 |
| 4,110,741 | 8/1978 | Hubert et al. | 340/573 |

Primary Examiner—Glen R. Swann, III
Attorney, Agent, or Firm—Robert E. Burns; Emmanuel J. Lobato; Bruce L. Adams

[57] ABSTRACT

An apparatus for detecting and signalling the presence and absence of movement of an object moving randomly in space and time has a portable transmitter carried by the moving object, such as a human operator. The transmitter transmits a carrier frequency signal so long as the operator continues his random movements. A detector associated with the transmitter detects the random movements and has sensing means which is a sensor that responds to the operator's movements and is movable randomly in three dimensions in response to the movements. The detector has a photo-responsive switch activated by the movement sensor which interrupts the emission of the carrier frequency signal when the human operator is substantially immobile and permits the transmission once the operator renews his movement. A receiver is positioned in an area for receiving the carrier frequency signal. It activates an alarm after a delay of a predetermined period of time after the carrier frequency signal is not received by it because of the interruption therefor while the operator is substantially immobile.

7 Claims, 3 Drawing Figures

4,292,630

DEVICE FOR THE OBTAINING OF AN ELECTRIC SIGNAL WHICH IS PROPORTIONAL TO AN AMOUNT OF MOVEMENT AND THEREFORE CAPABLE OF DETECTING ANY MOVEMENT OR ACCELERATION

BACKGROUND OF THE INVENTION

The present invention relates to a device which makes it possible to obtain an electric signal which is proportional to an amount of movement and therefore capable of detecting any movement and is suitable in particular for an individual signalling apparatus for the rapid detection of accidents.

An individual signalling apparatus for the rapid detection of accidents has been devised which comprises on the one hand a transmitter carried by the operator which continuously gives off a high-frequency signal. This transmitter is controlled by a switch which interrupts and reestablishes the emission of the high-frequency signal in random fashion as a function of the movements of the operator. The apparatus further comprises a receiver which can be located at any place in the area of use. The receiver comprises a clockwork which operates continuously after every stop of reception of the high-frequency signal and causes the giving of an acoustic alarm signal after the passage of a predetermined period of time.

The present invention concerns instruments and detectors which make it possible to supply an electric signal which is related to a movement and therefore a speed or acceleration, and in particular the apparatus indicated above.

In the known devices of this type, the detection of movement is not programmable and operates only when the movement takes place in a well-defined position in space, that is to say positions of an individual or of a machine along preferential axes. These systems generally employ mercury contained in a glass tube, whose movement information is given on a "all-on and all-off" basis.

SUMMARY OF THE INVENTION

The device in accordance with the invention makes it possible to avoid these drawbacks. It is possible with it to detect a movement in any position and to have a system which gives an electric signal which is substantially proportional to the movement and therefore a programming of the amount movement which it is desired to detect.

For this purpose, the invention concerns a device which makes it possible to obtain an electric signal proportional to an amount of movement and therefore capable of detecting any movement, suitable for an individual signalling apparatus for the rapid detection of accidents, comprising on the one hand a transmitter borne by the operator and continuously giving off a high-frequency signal. This transmitter is controlled by a switch which interrupts and reestablishes the emission of the high-frequency signal in random manner as a function of the movements of the operator. The invention further comprises a receiver which can be placed anywhere within the zone of use and comprises a clockwork continuously operating after each stop of reception of the high-frequency signal and controlling the giving off of an acoustic alarm signal after the passage of a predetermined period of time, which device is characterized by the fact that on the one hand it has a ball contained within a photoelectric field and capable of moving in space and that therefore the field received is proportional to the movement and that on the other hand the detection of the movement can be effected in space and is programmable.

In accordance with one embodiment of the invention, the detector is composed of a ball which can move in a cylindrical space. This space is swept by a photoelectric field perpendicular to the axis of this cylinder. The movement of the ball causes an instantaneous variation of the field proportional to the amount of movement given by the ball.

The electronic system consists of an amplification, a filter circuit which makes it possible to be independent of the initial condition at rest, which initial condition is established without movement and differs depending on the position of the ball in the field with respect to the position of the detector in space, as well as a circuit for the programming of the amount of movement which it is desired to detect.

BRIEF DESCRIPTION OF THE DRAWINGS

The invention will be clearly understood by reference to the following description given by way of illustration and not of limitation, and the accompanying drawing in which.

DESCRIPTION OF THE PREFERRED EMBODIMENT

Figure 1:
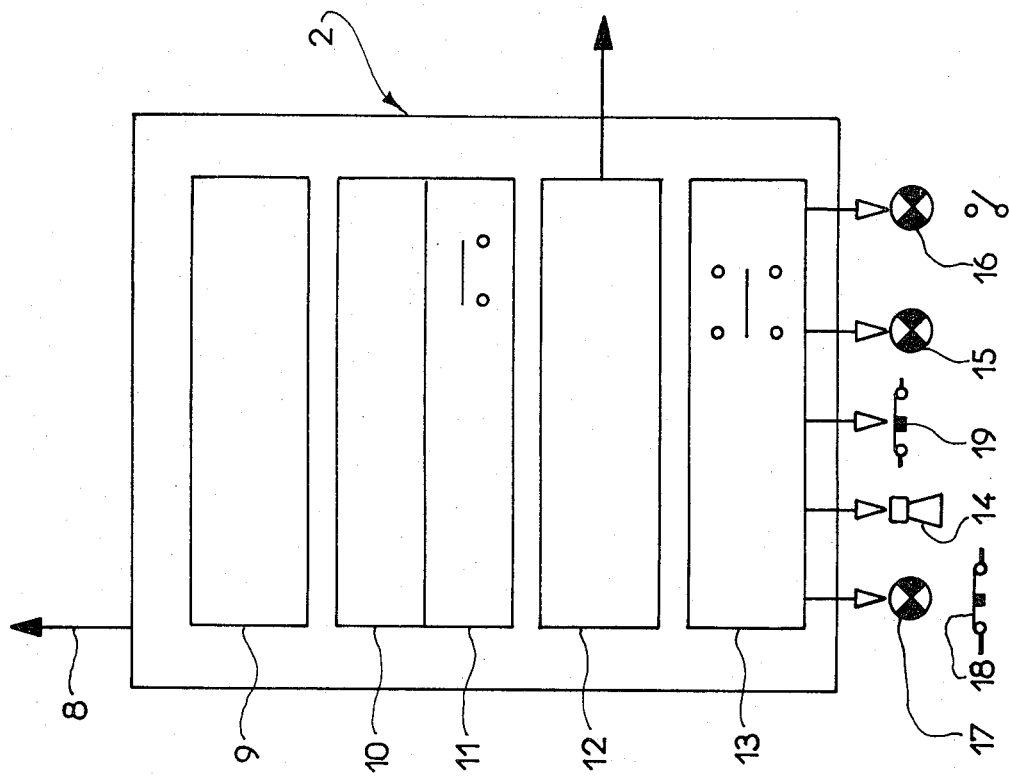
FIG. 1 is a block diagram of an individual signalling apparatus.
Figure 1:
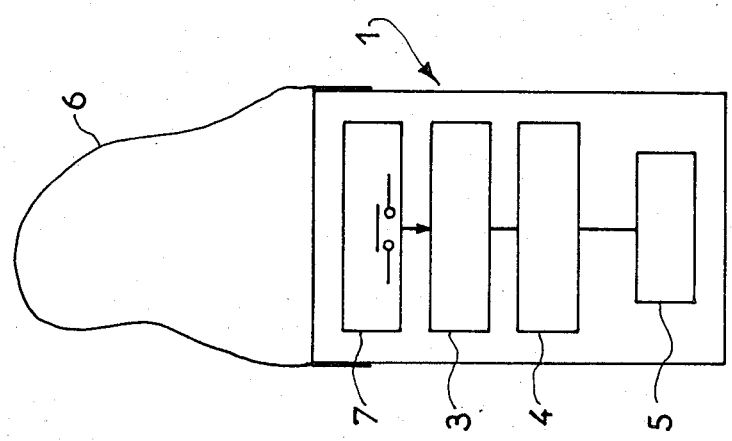

The apparatus shown in FIG. 1 comprises essentially two distinct parts, namely on the one hand a transmitting unit 1 carried by an operator, possible accidents to whom must be rapidly detected and, on the other hand, a receiver unit 2.

The transmitter unit 1 comprises a transmitter proper 3 connected to a sampler 4 and energized by a battery 5. This transmitter is connected to an antenna 6 of the shoulder strap type and it produces a carrier of high frequency, for instance of 27 MHZ. The transmitter 3 operates under the control of a detector 7 which closes its contact when the operator is moving.

Figure 2:
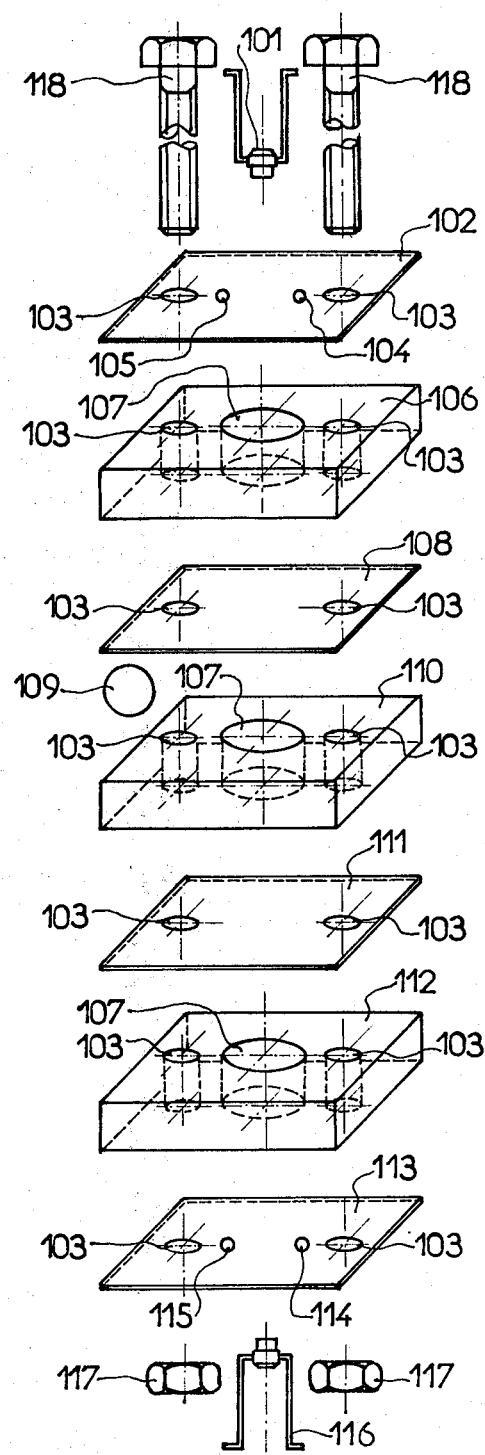
FIG. 2 illustrates by way of example one embodiment of the detector, the element of the device comprising the pickup and its associated electronic system.
Figure 3:
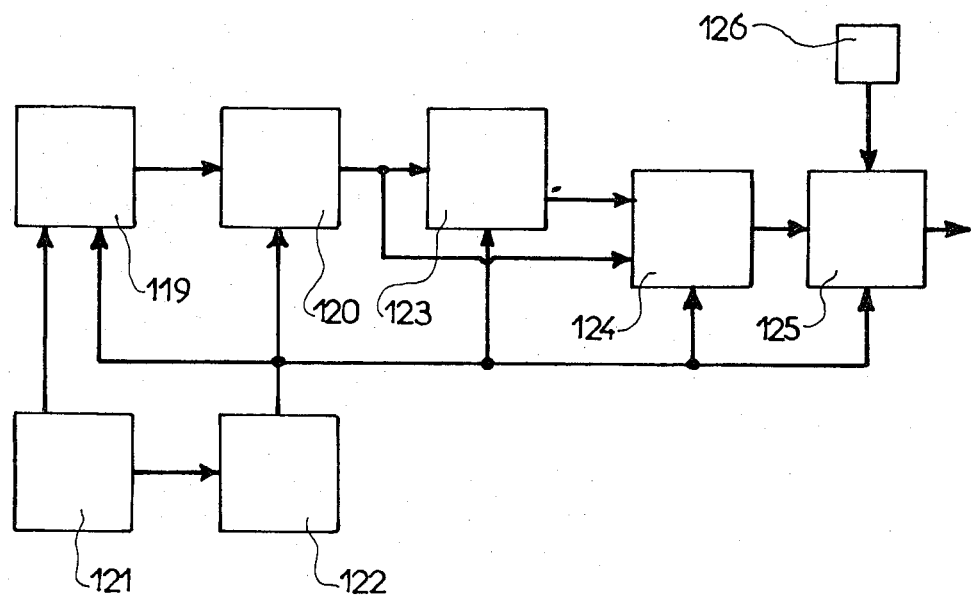
FIG. 3 illustrates by way of example one embodiment of the device in accordance with the invention.

As shown in FIGS. 2 and 3, the device comprises a detector 119 composed of the assembly consisting of the printed circuit 102 on which there is mounted a transmission diode or photodiode 101 of a wavelength of between 500 and 1200 manometers; a printed circuit 113 on which there is mounted a phototransistor 116; the circuits 102 and 113 are connected together with, between them, the elements 106, a plate of metal or other material provided with a hole at 107; the transparent element 108, 110 same as 106, 111 same as 108, 112 same as 106. Between 108 and 111 there is incorporated a ball 109 which moves in the cylindrical passage 107 of 110. The assembly is held together by bolts 118 which pass through the holes 103 and are locked by the nuts 117.

The photoelectric field which is emitted by the photodiode 101 which is perpendicular to the axis formed by 107 is intercepted by the ball 109.

The phototransistor 116 then receives a gradient of the field caused by the movement of the ball 109. The electric signal developed by the phototransistor is proportional to the movement.

The associated electronic system (FIG. 3) then processes the analog signal obtained on the one hand by feeding the transmission diode via a battery 121 and the phototransistor and the other circuits via 122 which is a positive or negative supply with zero referential. The electric signal of the gradient of the field is then amplified by an element 120 which can be a linear amplifier. The initial condition is extracted by a linear amplifier-filter 123. The circuit 124 is a linear subtracter which reduces the variation of the field to a fixed referential which is independent of the initial condition. The circuit 125 is a comparator which provides an electric signal upon a movement greater than that programmed by the element 126 which is a potentiometer which provides the comparison threshold between a fixed electric value and a variation of the field, and therefore the variable movement.

The device which forms the object of the invention can be used in all cases where movement is to be detected. It can be used for the detection of the movement of a man for the purpose of the protection of an isolated worker, the detection of mechanical vibration and any system or element which is subject to movement.

The receiving assembly 2 comprises a receiving antenna 8, a receiver proper 10 and a decoder 11. It may also comprise a battery 9 and a battery charger 12 which can also be used to recharge the battery 5 of the transmitter.

One important element of the receiving assembly 2 consists of a clockwork 13 having several outlets. One of these outlets is connected to an acoustic annunciator 14, and another to a lamp 15, which are placed in operation after the passage of a predetermined period of time, for instance about 20 to 30 seconds after the stop of any reception. The clockwork is also connected to an on-off pilot bulb 16 and a prealarm pilot bulb 17 with which a push button 18 is associated. Another additional recocking push button 19 can be provided.

The operation of the apparatus in accordance with the invention is as follows: as long as the operator is moving, the switch is closed and the transmitter 3 continuously gives off a high-frequency carrier of 27 MHZ. This switch at random interrupts the transmission of the carrier as a function of the movements of the operator and then causes the reestablishing of the transmission. The permanent stopping of the transmission takes place only if the operator is in a practically stationary position.

In the receiving unit 2 the clockwork 13 is not engaged as long as the receiver 10 receives the high frequency carrier, that is to say as long as the operator is moving.

On the other hand, as soon as the switch, as a result of the immobility of the operator, interrupts the emission of the high-frequency carrier, this stopping of the signal is detected by the receiver 10 and the decoder 11, which causes the engagement of the clockwork 13. If the stopping of the high frequency carrier continues for a predetermined period of time, for instance about 20 to 30 seconds, the clockwork 13 upon the expiration of this period of time gives off an alarm signal by means of the acoustic annunciator 14 and/or a luminous alarm by means of the bulb 15. This signal advises the operator that the unit 1 is no longer emitting the high-frequency carrier.

If the operator is not injured, he need merely start moving again in order to transmit for a moment and then the clockwork 13 is automatically returned to zero.

On the other hand, if the operator does not move within a first period of time of 20 to 30 seconds, for instance as the result of an accident, the clockwork 13 brings about the giving off of a general alarm which may include a powerful alarm bell. The receiving assembly 2 contains the button 18 which makes it possible to turn off the alarm.

The electric power line is used to feed the receiving unit 2 and possibly to recharge the batteries. Otherwise, a charger is used. However, the charge life is calculated so as to make it possible to maintain full emission during a work shift.

What is claimed is:

1. Apparatus for detecting and signalling the presence of movement and absence of movement of an object moving randomly in space and time comprising, a portable transmitter carried in use by an object moving randomly in space and time and transmitting a carrier frequency signal, a detector associated with said transmitter for detecting the random movement of said object comprising a sensing means movable randomly in three dimensions in response to the random movement of said object and including a switch activated by said sensing means interrupting emission of the carrier frequency signal when said object is substantially immobile and re-establishing said emission of said carrier frequency signal upon renewed movement of said object after being substantially immobile an alarm, a portable receiver unit positioned in an area for receiving said carrier frequency signal, means on said receiver unit for activating said alarm after a predetermined period of continuous absence of emission of said carrier frequency signal is detected by said receiver unit, said sensing means comprising an element freely movable randomly in a three dimensional detection space in response to random movement of said object, and means defining said space.

2. Apparatus for detecting and signaling the presence of movement and absence of movement of an object moving randomly in space and time according to claim 1, in which said object is a human operator, said transmitter having means for said human operator to carry said transmitter, said alarm emitting a signal representative of a condition in which said operator has been immobile for said predetermined period of time.

3. Apparatus for detecting and signaling the presence of movement and absence of movement of an object moving randomly in space and time according to claim 1, in which said detection space comprises a field, means to develop said field, said element being free to randomly move in said field and mask a part thereof, and said switch means comprises means to detect the extent of the masking of said field.

4. Apparatus for detecting and signaling the presence of movement and absence of movement of an object moving randomly in sapce and time according to claim 3, in which said element comprises a spherical element.

5. Apparatus for detecting and signaling the presence of movement and the absence of movement of an operator moving randomly in space and time thereby to detect when the operator is immobile comprising, a portable transmitter carried in use by an operator moving randomly in space and time, said transmitter having means for transmitting a carrier frequency continuously while in use, a detector associated with said transmitter for detecting the random movement of said operator comprising sensing means having means defining a radiation field, an element freely movable randomly in three dimensions in said field in response to random movement of said operator and constrained to move in said field, said element being configured to be physically unstable to preclude substantially a physically stable condition of the element, switch means detecting and responsive to a varying extent of masking of said field by said element upon movement thereof to interrupt emission of said carrier frequency signal when said operator is substantially immobile and for re-establishing said emission of said carrier frequency signal upon renewed movement of said operator, a portable receiver unit positioned in an area for receiving said carrier frequency signal, and means on said receiver unit for activating an alarm after a period of continuous absence of emission of said carrier frequency signal is detected by said receiver unit.

6. Apparatus for detecting and signaling the presence of movement and absence of movement of an operator moving randomly in space and time according to claim 5, in which said element has a spherical configuration.

7. Apparatus for detecting and signaling the presence of movement and absence of movement of an operator moving randomly in space and time according to claim 5, in which said element is a ball, said switch means comprises a photodetector, and said means defining said field comprises a photodiode.

* * * * *